(No Model.)
P. E. HOLL.
CAR COUPLING.
No. 496,877. Patented May 9, 1893.
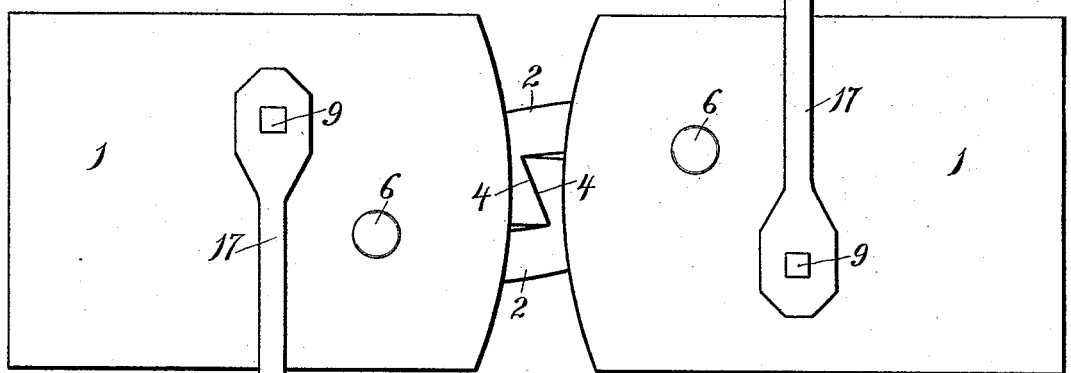
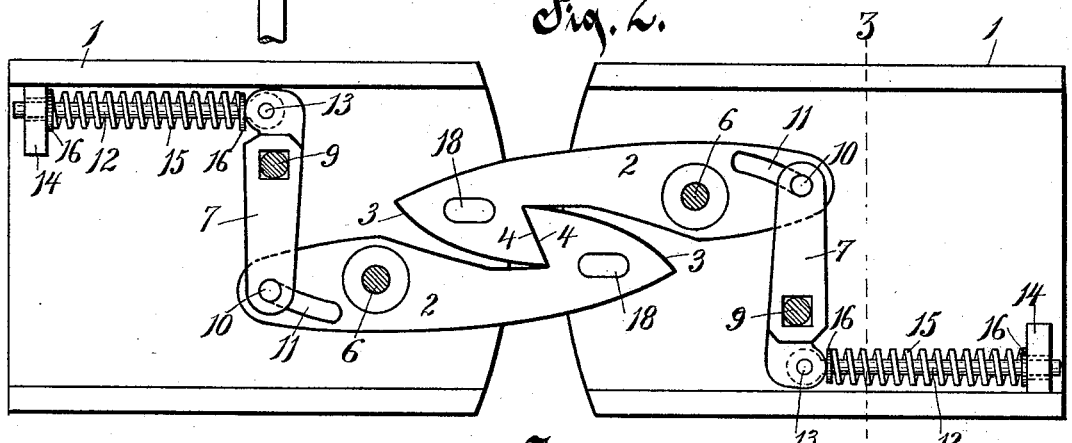
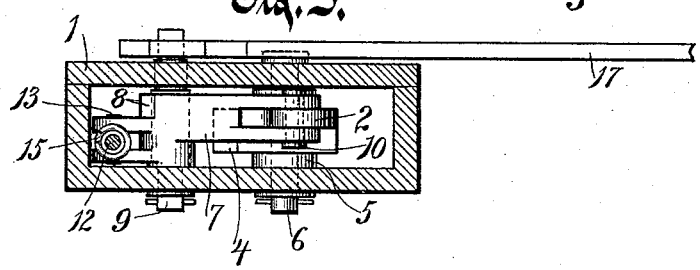
Witnesses.
A. H. Keeney.
Anna V. Faust.
Inventor.
Paul E. Holl
By
Benedict and Morsell
Attorneys.

UNITED STATES PATENT OFFICE.

PAUL E. HOLL, OF PITTSVILLE, WISCONSIN.

CAR-COUPLING.

SPECIFICATION forming part of Letters Patent No. 496,877, dated May 9, 1893.

Application filed February 23, 1893. Serial No. 463,369. (No model.)

*To all whom it may concern:*

Be it known that I, PAUL E. HOLL, of Pittsville, in the county of Wood and State of Wisconsin, have invented a new and useful Improvement in Car-Couplings, of which the following is a description, reference being had to the accompanying drawings, which are a part of this specification.

My invention has relation to improvements in car couplings, of that class known as "self-couplers."

The device consists primarily in the provision of point-headed hooks arranged in the opposite draw-heads, and provided with a sufficient amount of lateral play to allow the wedge-shaped surfaces to slip past each other, springs being provided to keep them in engagement when once connected.

Special means are used to withdraw the hooks from each other when they are uncoupled.

In the accompanying drawings, Figure 1, is a plan view of the invention. Fig. 2, is a horizontal sectional view, and Fig. 3, is a transverse, vertical section, on the line 3—3 of Fig. 2, looking toward the left.

Like numerals of reference designate like parts throughout the several views.

Referring to the drawings the numerals 1, 1 indicate opposite draw-heads, in which is arranged the coupling mechanism. As this mechanism in one draw-head is duplicated in the other, the description, for the sake of brevity and conciseness, will be confined to the singular number. While the parts, as just stated, are duplicated in the two draw-heads, yet, it will be understood, as clearly shown by the drawings, that they are oppositely arranged so as to provide for the coupling and uncoupling.

The numeral 2 indicates a point-headed hook projecting out beyond the forward end of the draw-head, said hook provided with a wedge-shaped or beveled surface 3 and an inclined engaging surface 4. The shank of the hook is provided medially with an enlargement 5, through which portion a pivot pin 6 passes, said pin having its bearings in the top and bottom of the draw-head.

Arranged at approximately right angles to the rear reduced end of the shank of the hook is a connecting link or arm 7, said arm having a medial enlargement 8 through which a crank pin 9 passes. The opposite ends of the connecting link or arm are bifurcated, as more clearly shown in Fig. 3, and the inner furcated members straddle the reduced end of the shank of the hook, a pivotal connection being formed by means of a pin 10 working through an elongated slot 11 in the end of the coupling hook.

Between the arms of the outer bifurcated end of the connecting link passes a rod 12, pivotally connected thereto by means of a pin 13. The opposite extremity of the rod passes through an aperture formed in a lug 14 shown in Fig. 2. A spring 15 encircles the rod, and is confined between two disks or washers 16, 16.

The crank pin 9 of the connecting link 7, hereinbefore referred to, extends through the top of the draw-head and this exterior portion is formed square or rectangular in cross section, to provide for the ready engagement therewith of an operating handle or lever 17, which extends out laterally beyond the draw-head so as to be readily manipulated by a person standing at the side of the car.

It will be noticed, by an inspection of Fig. 2, that each of the pointed hooks is provided with apertures 18, 18. This provides for coupling a car equipped with my improved device to a car having the ordinary coupling link, or other form adapted for the insertion of a coupling pin. The pin is passed through the aperture 18, and then through the link or other device employed in connection with the car to be coupled.

In the operation of coupling two cars both provided with the form of coupling herein described and shown, the wedge-shaped surfaces of the point-headed hooks as they approach each other will first engage, and as said hooks are free to turn on the pivot pins 6, a sufficient amount of lateral play is thereby allowed to permit said wedge-shaped surfaces to pass each other. When the outer ends of the hooks are thus forced laterally the inner ends are actuated in the opposite direction, which has the effect of turning the connecting link 7 on its pivot, and, as by this movement the outer end of said connecting link is thrown rearwardly, the coiled spring 15 is necessarily compressed between the disks or washers 16, 16. It is obvious, therefore, that the moment the beveled or wedge-shaped surfaces ride past each other, the recoil of springs 15 will force the connecting links back to their normal position, which latter will return the point-headed hooks to their former position, that is, throw the outer ends inwardly so that the inclined locking surfaces 4 will be made to register and thus securely lock the hooks.

The means employed for withdrawing the hooks from each other when they are to be uncoupled consists of the levers or handles 17 herein before described, adapted to engage the squared upper end of crank-pin 9. The operator manipulates the outer end of this handle or lever from the side of the car, without the necessity of going between the ends of the two cars, and by turning the same in the proper direction, it of course will throw the outer end of the hook desired to be operated laterally a sufficient distance to clear the inclined locking surfaces.

From the above description, it will be seen that I provide a simple though effective coupling, entirely automatic in the operation of connecting the cars, and so constructed as to reduce the chances of accidental uncoupling or danger to the life of the trainman to the minimum.

What I claim as my invention, and desire to secure by Letters Patent, is—

1. In a car coupling, the combination, of opposite draw-heads, hooks pivoted therein, spring-encircled rods, pivoted connecting links or arms pivotally connected at opposite ends with the hooks and rods, respectively, and means for turning said links or arms upon their pivots, substantially as set forth.

2. In a car coupling, the combination, of opposite draw-heads, point-headed hooks medially pivoted therein, said hooks provided with wedge-shaped surfaces and with registering inclined locking surfaces, longitudinally arranged spring-encircled rods, transversely arranged pivoted links or arms, pivotally connected at opposite ends with the hooks and rods, respectively, and means for actuating said links or arms, substantially as set forth.

3. In a car coupling, the combination, of opposite draw heads, point-headed hooks, having their inner ends provided with elongated slots, pivots passing medially through the shanks of the hooks, longitudinally arranged spring encircled rods, transversely arranged medially pivoted links or arms, pivotally connected at opposite ends with the hooks and rods, respectively, and means for actuating said links or arms, substantially as set forth.

4. In a car coupling, the combination, of opposite draw-heads, point-headed hooks, having their inner ends provided with elongated slots, pivot pins passing medially through the shanks of the hooks, apertured lugs or projections within the draw-heads, longitudinally arranged rods, having their rear ends passing through the apertured lugs, disks or washers at opposite extremities of the rods, springs confined between said disks or washers, transversely arranged links or arms, pivotally connected at opposite ends with the hooks and rods, respectively, crank-pins passing medially through the links or arms, and operating levers or handles connected to the upper ends of the crank-pins, and extending laterally beyond the sides of the draw-heads, substantially as set forth.

In testimony whereof I affix my signature in presence of two witnesses.

PAUL E. HOLL.

Witnesses:
  CHAS. HEUER,
  JOS. KRAUS.